(12) United States Patent
Allaert et al.

(10) Patent No.: US 12,325,148 B2
(45) Date of Patent: Jun. 10, 2025

(54) PROCESS FOR THE PRODUCTION OF PARTICLE BOARD OR WOOD FIBER BOARD

(71) Applicant: UNILIN, BV, Wielsbeke (BE)

(72) Inventors: Laurens Allaert, Ooigem (BE); Geert Coudenys, Lotenhulle (BE); Veronique Hoflack, Crupet (BE); Jan Goeminne, Vielsalm (BE); Koen Nel, Kortrijk (BE)

(73) Assignee: UNILIN, BV, Wielsbeke (BE)

( * ) Notice: Subject to any disclaimer, the term of this patent is extended or adjusted under 35 U.S.C. 154(b) by 186 days.

(21) Appl. No.: 17/908,661

(22) PCT Filed: Mar. 1, 2021

(86) PCT No.: PCT/IB2021/051681
§ 371 (c)(1),
(2) Date: Sep. 1, 2022

(87) PCT Pub. No.: WO2021/176326
PCT Pub. Date: Sep. 10, 2021

(65) Prior Publication Data
US 2023/0099498 A1 Mar. 30, 2023

(30) Foreign Application Priority Data
Mar. 3, 2020 (BE) .................................. 2020/5145

(51) Int. Cl.
*B27N 3/18* (2006.01)
*B09B 3/45* (2022.01)
(Continued)

(52) U.S. Cl.
CPC .................. *B27N 3/18* (2013.01); *B09B 3/45* (2022.01); *B27N 3/007* (2013.01); *B27N 3/02* (2013.01);
(Continued)

(58) Field of Classification Search
CPC . B27N 3/00; B27N 1/00; B27N 3/007; B27N 3/02; B27N 3/18; B09B 3/45;
(Continued)

(56) References Cited

U.S. PATENT DOCUMENTS 2,234,188 A  3/1941 Morgan et al.
3,741,863 A  6/1973 Brooks
(Continued)

FOREIGN PATENT DOCUMENTS

CN  101463570 A  6/2009
CN  101722552 A  6/2010
(Continued)

OTHER PUBLICATIONS

Wan, Hui & Wang, Xiang-Ming & Barry, Alpha & Shen, Jun. 2014. Recycling Wood Composite Panels: Characterizing Recycled Materials. BioResources. 9. 10.15376/biores.9.4.7554-7565 (Year: 2014).*

(Continued)

*Primary Examiner* — Andrew L Swanson
(74) *Attorney, Agent, or Firm* — Workman Nydegger (57) ABSTRACT

A process for the production of particle board, MDF board or HDF board includes the step of recycling particle board material, MDF and/or HDF board material in which recycled chips and/or recycled wood fibers are produced. The process includes the step in which the particle board material, the MDF and/or HDF board material is wetted, heated and pressurized, such that this material is kept under pressure and at an elevated temperature for a certain time. The process involves the step of supplying the recycled chips and/or the recycled wood fibers as base material in a production process of particle board, MDF board or HDF board.

18 Claims, 2 Drawing Sheets

(51) Int. Cl.
  B27N 3/00      (2006.01)
  B27N 3/02      (2006.01)
  B27N 3/04      (2006.01)
  C08J 11/14     (2006.01)
  C08L 97/02     (2006.01)
  B09B 101/85    (2022.01)

(52) U.S. Cl.
  CPC .............. B27N 3/04 (2013.01); C08J 11/14 (2013.01); C08L 97/02 (2013.01); *B09B 2101/85* (2022.01); *C08J 2397/02* (2013.01); *C08L 2205/16* (2013.01); *C08L 2207/20* (2013.01)

(58) Field of Classification Search
  CPC ... B09B 2101/85; C08J 2397/02; C08J 11/14; C08L 2205/16; C08L 2207/20; C08L 97/02
  See application file for complete search history.

(56) References Cited

U.S. PATENT DOCUMENTS

| | | | |
|---|---|---|---|
| 5,262,003 A | 11/1993 | Chupka et al. | |
| 5,804,035 A | 9/1998 | Michanickl et al. | |
| 6,372,085 B1 | 4/2002 | Hsu et al. | |
| 2003/0056873 A1* | 3/2003 | Nakos | B27N 1/00 156/327 |
| 2011/0014425 A1* | 1/2011 | Wirz | B27N 3/00 427/209 |
| 2022/0315854 A1* | 10/2022 | Despres | B09B 3/45 |

FOREIGN PATENT DOCUMENTS

| | | |
|---|---|---|
| CN | 103451985 A | 12/2013 |
| CN | 107363953 A | 11/2017 |
| DE | 4224629 A1 | 1/1994 |
| DE | 19819988 A1 | 4/1999 |
| EP | 1222061 A1 | 7/2002 |
| GB | 2476465 A | 6/2011 |
| SE | 1951380 A1 | 6/2021 |
| WO | 9210606 A1 | 6/1992 |
| WO | 9524998 A1 | 9/1995 |
| WO | 0001877 A1 | 1/2000 |
| WO | 0139946 A1 | 6/2001 |
| WO | 03026859 A1 | 4/2003 |
| WO | 2005007968 A1 | 1/2005 |
| WO | 2011077155 A1 | 6/2011 |
| WO | 2018172959 A2 | 9/2018 |
| WO | 2019064201 A1 | 4/2019 |
| WO | 2021176326 A1 | 9/2021 |

OTHER PUBLICATIONS

The Engineering ToolBox (2003). Saturated Steam—Properties—Imperial Units. [online] Available at: https://www.engineeringtoolbox.com/saturated-steam-properties-d_273.html [Accessed Apr. 20, 2024] (Year: 2003).*

Search Report from corresponding Belgian Application No. BE2020/5145, Nov. 19, 2020.

International Search Report from PCT Application No. PCT/IB2021/051681, May 14, 2021.

Third Party Observation from PCT Application No. PCT/IB2021/051681, Jan. 28, 2022.

Wan et al., "Recycling Wood Composite Panels: Characterizing Recycled Materials", BioResources, vol. 9, No. 4, Oct. 28, 2014, pp. 7554-7565.

* cited by examiner

Fig. 2

PROCESS FOR THE PRODUCTION OF PARTICLE BOARD OR WOOD FIBER BOARD

TECHNICAL FIELD

The invention relates to a process for the production of particle board or wood fiber board in which wood chips or wood fibers recovered from recycled particle board, from recycled MDF (Medium Density Fiber board)—or from recycled HDF (High Density Fiber board) panels are, at least to some degree, used as base material.

PRIOR ART

WO2011/077155A1 describes a method for recycling "engineered wood panels", such as wood fiber boards, in which wood fibers are recovered which may be used instead of new wood fibers. The boards or panels are mechanically broken down and mixed with water to form a slurry. This slurry is then heated by passing an electrical current through the slurry. This heating causes a reduction in the strength of the bonds between the wood fibers. This heating may take place at a superatmospheric pressure. After heating, it is possible to release the slurry quickly, for example by spraying it via a valve, drying it and separating the fibers from each other. An apparatus is described for carrying out the method as a continuous process.

It is a drawback of this method that the adhesive from the boards dissolves in the bath in which the slurry is heated. This may lead to saturation of the bath, as a result of which the bonds are no longer detached, or the electrical conductivity of the slurry—necessary for heating via the Joule effect—may change. Additives which are necessary to adjust the conductivity may also cause problems.

US2003/0056873A1 describes a process for producing wood fiber boards—via recycling of waste from composite wood products—by means of a conventional dry production process for producing wood fiber boards. The process employs a modified treatment in a pre-heater, followed by mechanical refining in a refiner, resulting in recycled fibers. These recycled fibers then constitute at least 20 percent by weight of the fiber boards produced. In the pre-heater, the recycled wood products are chemically treated under pressure and in the presence of steam.

It is a drawback of this process that chemicals have to be added in the pre-heater. This may result in corrosion problems. These chemicals also lead to polluted waste streams which have to be treated in a suitable manner.

DE4224629 describes a process for recycling panel-shaped elements made of wood products glued together by means of urea-formaldehyde binder and with or without a plastic coating. The process relates in particular to the recycling of wood fiber boards or particle boards. The panel-shaped elements are broken into fragments in a pre-treatment step. These fragments are treated in water vapor atmosphere for a certain amount of time—preferably in a saturated water vapor atmosphere—under high pressure and high temperature. As a result thereof, the fragments are transformed into fibrous, chip-like or platelet-like base material which is glued to form new panel-shaped elements. To this end, the recycled fibrous, chip-like or platelet-like base material may be coated with adhesive. Alternatively, chemically modified adhesive may be used, more specifically the urea-formaldehyde glue residues which are still attached to the recycled fibrous, chip-like or platelet-like base material.

U.S. Pat. No. 5,804,035 describes a process for recovering chips and fibers from waste of wood products, old furniture, production waste, wood products glued together with urea-formaldehyde binders or with other binders which may be hydrolyzed or chemically broken down. These materials are treated at high temperature. In a first step of the process, these materials are impregnated with an impregnating liquid, as a result of which these materials absorb at least 50% of their weight in impregnating liquid. In a second step, heating to between 80 and 120° C. is performed. The materials disintegrated in this way are then sorted by means of sieving or other techniques.

WO2003/026859—by the same applicants and inventors as U.S. Pat. No. 5,804,035—describes a process similar to that in U.S. Pat. No. 5,804,035, but which is more economical.

It is a drawback of these processes that a mixture or wood fibers and wood chips is obtained which does not make it possible to manufacture high-quality products, since the production of high-quality products requires base material with uniform properties.

WO2005/007968A1 describes a method for recovering wood constituents from a board material consisting of a matrix of lignocellulose material bonded by glue. The method comprises treating the material with a combination of electromagnetic radiation and soaking or immersing it in a liquid medium, and recovering constituents. It is a drawback that special equipment is required to generate the electromagnetic radiation to heat up the material, and that it is more difficult to incorporate such a process in a continuous process.

WO00/01877 describes a process and an apparatus for treating and recovering wood fiber board waste and particle board waste. Wood fiber board waste and particle board waste is fed into a steam chamber and treated with pressurized steam. At the end of the steam treatment, the excess of steam is discharged from the steam chamber and the steam-treated waste is passed through a rotating drum. Wood fibers and chips pass through the screens of the drum and are collected for drying and further processing. Waste, such as melamine coatings, is collected and discharged. The collected wood fibers and wood chips may be processed for use in the production of paper, cardboard or particle board, or as material to cover the soil.

U.S. Pat. No. 3,741,863 relates to a method of producing boards using recycled waste cellulose products. The method comprises the following steps: comminuting the waste material to produce small pieces, drying these small pieces to at least 85 percent solids in order to remove excess moisture and to sterilize the small pieces, separating the dried cellulose waste products from the non-cellulose waste, heating the cellulose small pieces in the presence of a non-flammable medium in order to increase the temperature of the small pieces and to sterilize the small pieces, mechanically refining the heated small cellulose pieces, separating off the fibers and fiber bundles from the non-flammable medium, adding a resin to the fibers and the fiber bundles and mixing them intimately, forming a mat from the fibers and the fiber bundles; and compressing this mat under heat and pressure to form a plate.

WO01/39946A1 describes a process for producing fiber boards via recycling of waste of composite wood products by means of a conventional continuous dry wood fiber board process wherein the process in the pre-heater and/or in the refiner is modified. These modifications ensure that fiber boards comprising at least 20 percent by weight of recycled fibers can be produced.

It is a problem of the recycling methods from the prior art for recycling MDF and HDF boards that they require complicated equipment, that they are difficult to incorporate in existing production processes for particle board, MDF or HDF boards, are not economically cost-effective and do not result in the required continuous good-quality boards produced using the recovered material.

DESCRIPTION OF THE INVENTION

It is an object of the invention to offer a solution for shortcomings in the recycling processes for MDF and HDF board material from the prior art.

Therefore the invention relates to a process for the production of particle board, MDF board or HDF board. This process comprises the step of recycling particle board material, MDF and/or HDF board material in which recycled chips and/or recycled wood fibers are produced. The process comprises the step in which the particle board material, the MDF and/or HDF board material is wetted, heated—preferably using steam—and pressurized. This material is kept under pressure and at an elevated temperature for a certain time. The process comprises the step of supplying the recycled chips and/or the recycled wood fibers as base material in a production process for particle board, MDF board or HDF board.

This heating and pressurizing results in disintegration, for example or inter alia by hydrolysis, of the adhesive connections in the particle board material, the MDF and/or HDF board material. The process according to the invention makes it possible to recycle particle board, MDF board or HDF board in an effective and efficient manner, in which base material is produced which is used for manufacturing new particle board, MDF board or HDF board. The process according to the invention is preferably an in-line production process for producing new particle board, MDF board or HDF board. Preferably, this process is continuous; however, such a continuous and in-line process may comprise intermediate buffer stores for material. However, it is also possible to carry out the process in a discontinuous manner.

The expression "pressurized" is understood to mean that a pressure of more than 1 bar is applied to the material, preferably a pressure of between 3 and 30 bar, preferably a pressure of more than 5 bar, more preferably a pressure of more than 10 bar.

Preferably, the production process for particle board, MDF board or HDF board involves a dry production process. The expression "dry production process" is understood to mean that the recycled chips and/or the recycled wood fibers as base material for particle board, MDF board or HDF board are not supplied in water in order to form the board.

Preferably, the particle board material, MDF and/or HDF board material to be recycled is glued together using MDI (methylene diphenyl diisocyanate) or pMDI (polymeric methylene diphenyl diisocyanate) adhesive or glued together using adhesives which comprise MDI or pMDI. Such adhesives are less susceptible to hydrolysis during the recycling process according to the invention than, for example, urea-formaldehyde adhesives. It has been found that this makes the recycling more critical. However, it has been found that the risk of disadvantageous by-products being formed in the adhesive during the recycling process is reduced if the material to be recycled comprises MDI adhesive or pMDI adhesive or comprises adhesives which comprise MDI or pMDI. Such by-products may be disadvantageous when recoating the recycled chips and/or the recycled wood fibers with adhesive.

Preferably, the step of wetting, heating and pressurizing is preceded by the mechanical breaking down of the particle board material, the MDF and/or HDF board material, preferably into pieces having an average size according to numbers of less than 10 cubic centimeters, more preferably into pieces having an average size according to numbers of less than 5 cubic centimeters, more preferably into pieces having an average size according to numbers of less than 3 cubic centimeters. Preferably, dust is separated off after the mechanical breaking down, for example by means of sieving, by means of rinsing or by means of wind-sieving.

The mechanical breaking down preferably takes place with the particle board material, the MDF and/or HDF board material in dry condition. The expression "in dry condition" is understood to mean that no wetting step is carried out before this mechanical breaking down.

Preferably, the step of wetting, heating and pressurizing comprises the step of wetting the particle board material, the MDF and/or HDF board material, preferably at a temperature of more than 70° C.—more preferably at a temperature of more than 80° C.; preferably under atmospheric conditions or at increased pressure. Preferably, this wetting is performed using steam.

Preferably, the wetting is performed in a continuous process or in a discontinuous process.

Preferably, the wetting is accompanied by the addition of additives, for example of surfactants, of one or more acids, or of one or more bases. However, it is also possible not to add additives; because it has been found that good results can also be achieved without additives.

Preferably, the particle board material, the MDF and/or HDF board material is heated to a temperature of less than 240° C., preferably of less than 230° C.; and preferably of more than 130° C., more preferably of more than 150° C. Such temperatures are very suitable, because they make it possible to hydrolyze or break down the adhesive connections in the particle board material, the MDF and/or HDF board material without affecting the wood fibers themselves, which would be the case at higher temperatures, since cellulose has a degradation temperature of 260° C.

Preferably, the particle board material, the MDF and/or HDF board material is subjected to a pressure of between 3 and 30 bar; preferably a pressure of more than 5 bar, more preferably a pressure of more than 7 bar, even more preferably a pressure of more than 15 bar for a time of at least 15 seconds, preferably of at least one minute, preferably less than 5 minutes, more preferably less than 3 minutes and more preferably less than 1 minute. Preferably, at a temperature of less than 240° C., more preferably of less than 230° C.; and preferably of more than 150° C. Such embodiments are preferred because they strike a balance between, on the one hand, breaking down the adhesive connections and, on the other hand, preventing damage to the wood itself of the chips and/or the wood fibers, thus yielding recycled material having optimum properties by means of the recycling process.

Preferably, heating is achieved using steam by means of steam injection—preferably by means of wet steam or by means of superheated steam—in the process equipment which comprises or conveys the particle board material, MDF and/or HDF board material. Preferably, additives are added in this case, for example surfactants, one or more acids or one or more bases. However, it is also possible not to add additives; this has also yielded good results. The process equipment conveying the material may preferably comprise a screw.

Preferably, the heating by steam is carried out by introducing the recycled particle board, the recycled MDF and/or the recycled HDF board material into a pressure vessel—preferably a pressure vessel with continuous flow or a discontinuous pressure vessel—and injecting steam (preferably wet steam or superheated steam) into this pressure vessel. Preferably, additives are added in this case, for example surfactants, one or more acids or one or more bases. It is also possible not to use additives; this has also yielded good results. Preferably, the particle board material, the MDF and/or HDF board material is removed from the pressure vessel by means of a screw. In embodiments of the process of the invention in which the step of steam explosion is performed, the steam explosion preferably occurs while or after the material emerges from the screw.

Preferably, the process comprises the step of steam explosion of the wetted, heated and pressurized particle board material, MDF and/or HDF board material, in which recycled chips and/or recycled wood fibers are produced during the steam explosion. This step facilitates and improves the recycling process, in particular when producing recycled wood fibers, since a better separation of the recycled material is achieved with the steam explosion.

The expression "steam explosion" of the material is understood to mean that moisture—in liquid and/or vapor form—in and around the material expands while the pressure is rapidly reduced, with the material being separated and individualized due to the increase in volume of the steam. There might still be a degree of cohesion between the wood chips and/or the wood fibers after the steam explosion. This cohesion may mainly consist of entangled recycled wood fibers. These entangled recycled wood fibers can be untangled by conveying the recycled wood fibers in a turbulent air stream. It is also possible to untangle these entangled wood fibers by mechanical action, for example by using contra-rotating pairs of discs with teeth or pins, for example just before the wood fibers are laid down to be compressed to form a board.

The steam explosion may take place in a continuous process or in a discontinuous process. Performing the steam explosion in a continuous process has the advantage that the flow of material is continuous and that it can easily be incorporated in existing continuous dry production processes for producing particle board, MDF board or HDF board. On the other hand, a discontinuous process offers better process control options and better options for processing batches containing different material using the most suitable process parameters.

Preferably, the steam explosion step is performed by pressing the particle board material, MDF and/or HDF board material through an aperture under pressure, the material ending up in an environment of lower pressure, as a result of which a quick pressure drop in the material occurs, thus causing the steam explosion. By the steam explosion, the material is refined to form wood chips and/or wood fibers.

Preferably, the steam explosion step is performed after the particle board material, MDF and/or HDF board material has been conveyed in a screw; more preferably the steam explosion step is performed at the exit of the screw. Preferably, the screw is configured in such a way that the particle board material, MDF and/or HDF board material in the screw is mechanically compressed. This is a highly efficient way of pressurizing the material which is conveyed in the screw.

Preferably, steam is injected into the screw. This is a particularly efficient way of heating the material which is being conveyed in the screw and, in addition, the injection of steam may lead to an increase in pressure. The steam which is injected into the screw may be wet steam or superheated steam. During or in addition to this injection of steam into the screw, one or more additives may be added. Surfactants, one or more acids or one or more bases may be mentioned as examples of such additives. However, it is also possible not to use additives; this has also yielded good results.

The use of a screw which compresses the material mechanically and also allows steam to be injected makes it possible to heat, pressurize and convey the material in an efficient manner; and to maintain the temperature and pressure for a time period during which the material is conveyed in the screw. This makes it possible to hydrolyze or break down the adhesive connections in the particle board material, MDF and/or HDF board material in an efficient and effective way for the steam explosion step.

In a preferred embodiment of the invention, the steam explosion step is performed in a discontinuous process, wherein the wetted, heated and pressurized particle board material, MDF and/or HDF board material is situated in a receptacle, and wherein a valve of the receptacle is opened, as a result of which the rapid pressure drop occurs which causes the steam explosion. Such embodiments make it possible to suitably adjust the process conditions for each batch, depending on the material which has to be processed. Preferably, the pressure drop during the steam explosion is at least 3 bar, more preferably at least 4 bar, still more preferably at least 5 bar; and even more preferably at least 7 bar, and preferably less than 12 bar and more preferably less than 10 bar, more preferably less than 8 bar, more preferably less than 7 bar. The selected ranges provide an optimum for the recycling process. A greater pressure drop means an improved separation of the material. However, it has been found that an excessively high pressure drop during the steam explosion is disadvantageous, since the structure of the wood itself may be damaged. It has furthermore been found that when the values for the pressure drop are too high during the hydrolysis of the adhesive of the particle board material, the HDF or MDF board material, disadvantageous components are formed—inter alia nitrogen-containing components—which are disadvantageous for the further production processes in which the recycled material is used and when the recycled material has to be recycled. It has been found that these disadvantageous components are virtually not formed at all if the particle board material, the HDF or MDF board material is adhesively bonded using MDI or pMDI adhesive or adhesives which comprise MDI or pMDI.

Preferably, during the steam explosion step, the pressure expands from a pressure of between 4 and 30 bar, preferably of more than 5 bar, more preferably of more than 10 bar, still more preferably of more than 15 bar.

Preferably, during the steam explosion step, the pressure expands to a pressure under 3 bar. More preferably under 2 bar, still more preferably under 1.5 bar.

Preferably, during the steam explosion step, the pressure expands in less than 3 seconds, preferably in less than 2 seconds, more preferably in less than 0.5 seconds. Such values are preferred because they result in an efficient separation of the wood material.

During the steam explosion step, the ratio between the pressure drop during the steam explosion and the duration of the steam explosion is preferably greater than 5 bar/second, preferably greater than 7 bar/second, more preferably greater than 10 bar/second, more preferably greater than 15 bar/second, still more preferably greater than 20 bar/second.

In an embodiment of the process according to the invention, the steam explosion is a multistage steam explosion. This is understood to mean that the expansion of the pressure takes place in a number of steps. As a result thereof, the separation of the material can be controlled more effectively, thus preventing excessive refining or disintegration.

In a preferred embodiment of the process according to the invention, repeated steam explosion steps are performed, preferably wherein the pressure drop during each of the repeated steam explosion steps is less than 10 bar, more preferably is less than 7 bar. It has been found that repeated steam explosion steps improve the recycling of the wood material. Surprisingly, it has been found that repeated steam explosion steps at the indicated maximum pressure drop values are better than one steam explosion step with a higher pressure drop. In the text above, the drawbacks of performing a steam explosion at an excessively high pressure drop have already been pointed out.

In a preferred embodiment, the material undergoes a mechanical dewatering process, for example by pressing—preferably between rollers—or by centrifuging, after the step in which the particle board material, the MDF and/or HDF board material has been wetted, heated—preferably using steam—and pressurized. If the process comprises the step of steam explosion of the wetted and pressurized particle board material, MDF and/or HDF board material, the optional mechanical dewatering process is performed after the steam explosion step. This mechanical dewatering process may also help to untangle the recycled wood fibers, more particularly to untangle entanglements of any remaining adhesive connections between wood fibers.

In a preferred embodiment of the invention, the process comprises the step of mechanically breaking down the particle board material, the MDF and/or HDF board material. Preferably, after the step of mechanically breaking down the particle board material, the MDF and/or HDF board material, this material is no longer passed through a mechanically operating apparatus which would mechanically refine this material and/or no further mechanical refining of this material takes place.

In a preferred embodiment of the invention, no mechanical refining of the recycled chips and/or wood fibers takes place after the step in which the particle board material, the MDF and/or HDF board material has been wetted, heated—preferably using steam—and pressurized.

In a preferred embodiment of the invention, no mechanical refining of the particle board material, MDF and/or HDF board material takes place between, on the one hand, the moment the wetted, heated and pressurized particle board material, MDF and/or HDF board material reaches the highest pressure and, on the other hand, the steam explosion. Such embodiments have been found to offer a very efficient recycling and, on the other hand, ensure that the investment costs of such an installation for recycling remains limited, since there is no need to invest in an apparatus—for example a refiner—for mechanically refining the recycled material.

In preferred embodiments of the invention in which the steam explosion step is performed, the recycled chips and/or recycled wood fibers are preferably not passed through a mechanically operating apparatus after the steam explosion which would result in a mechanical refining of the recycled chips and/or recycled wood fibers.

In preferred embodiments of the invention in which the steam explosion step is performed, the process comprises the step of mechanically refining recycled wood chips and/or the recycled wood fibers after the steam explosion. Preferably, this is carried out by the recycled material being passed through a mechanically operating apparatus. More preferably, the apparatus comprises grinding discs through which the material is passed. A "refiner" such as is also used in processes for producing wood fibers from new wood may be used for this. The refiner is a mechanical apparatus which comprises grinding discs with ridges into which the base material is introduced.

In a preferred embodiment of the process, the recycled chips and/or recycled wood fibers are not coated with adhesive. The expression "not coated with adhesive" is understood to mean that the recycled chips and/or recycled wood fibers are not coated with adhesive, and that these are used as part of the base material in the production process of particle board or MDF or HDF boards without having been coated with adhesive. In this production process, these recycled chips and/or the recycled wood fibers which have not been coated with adhesive may be mixed with chips or wood fibers which have been coated with adhesive. In such a process, the adhesive-coated wood fibers are preferably wood fibers which have been made from fresh wood.

In a preferred embodiment of the process, the recycled chips and/or recycled wood fibers are coated with adhesive. Preferably, urea-formaldehyde adhesive, melamine urea-formaldehyde adhesive, phenol adhesive, or MDI or pMDI adhesive is used therefor, or adhesive compositions which comprise one or more of the adhesives mentioned. It is possible to coat the recycled chips and/or recycled wood fibers with adhesive together with new chips and/or new wood fibers. On the other hand, it is also possible to coat new chips and/or new wood fibers in a step which is separate from the step of coating the recycled chips and/or recycled wood fibers with adhesive.

In preferred embodiments of the invention, the recycled chips and/or recycled wood fibers are coated with adhesive by introducing the recycled chips and/or recycled wood fibers into a pneumatic flow and injecting adhesive into this flow, preferably together with hardeners and preferably with additives, such as for example paraffin or wax. Preferably, this adhesive coating is carried out in a steam atmosphere.

Preferably, the recycled chips and/or recycled wood fibers—whether or not coated with adhesive—are conveyed in a—preferably hot—turbulent air stream. It is an advantage of this optional step that the recycled chips and/or recycled wood fibers are being dried while they are being conveyed in this turbulent air stream. It is a further advantage that the turbulence of the air stream can untangle at least some of the entangled recycled wood fibers.

According to an embodiment of the invention, only the recycled chips and/or the recycled wood fibers are used as wood material for the production of particle board, MDF board or HDF board. This makes it possible to operate in a fully circular way, without the addition of new wood base material.

More preferably, new, adhesive-coated wood chips and/or new, adhesive-coated wood fibers are also introduced into this—preferably hot—turbulent air stream, together with the recycled chips and/or recycled wood fibers, so that the recycled chips and/or recycled wood fibers are conveyed in this turbulent air stream together with the new, adhesive-coated wood chips and/or new, adhesive-coated wood fibers. The advantage thereof is that new, adhesive-coated base material is mixed with recycled base material. In addition, the material is also dried in this turbulent air stream.

The new, adhesive-coated wood chips and/or new, adhesive-coated wood fibers are preferably adhesive-coated with urea-formaldehyde adhesive, melamine urea-formaldehyde adhesive, phenol adhesive, or MDI or pMDI adhesive; or with bioadhesive or with adhesive compositions which comprise one or more of the adhesives mentioned. A bioadhesive is an adhesive which is not made of fossil base materials.

Preferably, conveying in the turbulent air stream is followed by one or more separation units, for example for separating off water vapor and hot gasses (for example by means of a cyclone) and/or for separating off heavy constituents—preferably by means of the force of gravity.

Preferably, the process comprises the step of producing particle board, MDF board or HDF board according to a dry process, wherein the recycled chips and/or recycled wood fibers are used as base material in this step, thus forming the recycled base material; and also new, adhesive-coated chips and/or new adhesive-coated wood fibers are used as base material, thus forming the new, adhesive-coated base material. Preferably, the recycled base material is mixed with the new, adhesive-coated base material before this production step. More preferably, this mixing takes place before, in or after the blowline which pneumatically conveys the new, adhesive-coated base material to the dry production of the particle board, MDF board or HDF board.

Preferably, the proportion of recycled base material of the combined recycled base material and new, adhesive-coated base material is less than 50 percent by weight; and more preferably less than 20 percent by weight. More preferably, this percentage is less than 5 percent by weight if recycled base material is used which is not coated with adhesive.

Preferably, the weight percentage of recycled base material with respect to the sum of the recycled base material and the new, adhesive-coated base material is constant throughout the thickness of the produced particle board, MDF board or HDF board.

Preferably, the produced particle board, MDF board or HDF board is composed of several layers. At least one of the surface layers; and preferably the surface layers on both sides of the produced board; comprises less recycled base material than at least one other layer of the board. Preferably, the at least one surface layer—and more preferably the surface layers on both sides of the produced board—do not comprise recycled base material. A board which has a core layer containing a certain weight percentage of recycled base material; and which has a layer on both sides containing a lower weight percentage of recycled base material or not containing any recycled base material has been found to be particularly advantageous.

In a preferred embodiment of the invention, in the step of the production process of particle board, MDF board or HDF board, only the recycled chips and/or the recycled wood fibers are used as wood-containing base material. Preferably, this production process is a dry production process.

In a preferred embodiment of the invention, the mentioned process steps are carried out in-line and preferably continuously.

Preferably, the particle board material, the MDF and/or HDF board material which is recycled comprises or involves production waste which originates from a process for the production of particle board, MDF board or HDF board according to the invention. It is an advantage that the composition of the material to be recycled is well-known, as a result of which the parameters of the process for producing the recycled base material can be adjusted more accurately.

In addition, this base material is suitable for the production of the intended board material.

Preferably, the particle board material, the MDF and/or HDF board material which is recycled comprises or involves post-consumer material. It is an advantage that this results in the creation of a circular stream of material.

Preferably, the process of the invention relates to a process for the production of MDF board or HDF board. The recycling step relates to the recycling of particle board material, of MDF and/or HDF board material in which recycled wood fibers are produced. The recycled wood fibers are introduced in the production process of the MDF or HDF boards.

Preferably, the recycled wood fibers and also new, adhesive-coated wood fibers are used as base material in the step of producing MDF board or HDF board via a dry process. Preferably, the recycled wood fibers are on average finer and/or shorter than the new wood fibers. Preferably, the recycled fibers are mixed with the new, adhesive-coated wood fibers for this production step.

Preferably, as base material, in the step of producing MDF board or HDF board via a dry process, the recycled wood fibers and also new, adhesive-coated wood fibers are used as base material. The parameters for the process of producing recycled wood fibers are set and/or the particle board material, MDF or HDF board material to be recycled is selected in such a manner that the recycled wood fibers have an average length which deviates at most 20%—and preferably at most 10%—from the average length of the new wood fibers. In this way, it is possible to produce high-quality MDF or HDF boards. Preferably, the recycled fibers are mixed with the new, adhesive-coated wood fibers before the production step of producing MDF board or HDF board via a dry process.

Preferably, new wood fibers are produced from new and/or recycled wood in an in-line process which runs parallel to the in-line process of recycling the MDF or HDF board material; which new wood fibers, together with the recycled wood fibers, form the base material for producing the MDF or HDF board. More preferably, the process for producing new wood fibers comprises the step of mechanically refining the new and/or recycled wood, preferably by means of rotating discs between which the material is passed, more preferably a "refiner".

Preferably, the—more preferably continuous—process for producing new wood fibers comprises the step of mechanically refining the new wood and/or the recycled wood, preferably by means of rotating discs between which the material is passed, more preferably a "refiner". In this preferred embodiment, the process of recycling MDF or HDF board material in which recycled wood fibers are produced comprises the step of mechanically refining the MDF or HDF board material after the step of wetting, heating and pressurizing the MDF or HDF board material—and, if the process comprises the step of steam explosion, preferably after the steam explosion step —, preferably by means of rotating discs between which the material is passed, more preferably a "refiner". More preferably, the mechanical refining of the new and/or recycled wood and the mechanical refining of the MDF or HDF board material are separate steps which are performed in parallel in the process for producing the MDF or HDF board.

Preferably, the consumed mechanical energy per ton of new wood fibers produced in the step of mechanically refining the new wood is greater—and preferably at least 20% higher, more preferably at least 50% higher—than the consumed mechanical energy per ton of recycled wood fibers produced in the step of mechanically refining the recycled base material.

The production process—preferably a dry production process—for producing particle board, MDF board or HDF board may be a continuous production process, but it may also be discontinuous.

BRIEF DESCRIPTION OF THE FIGURES

In order to show the features of the invention in more detail, some preferred embodiments are described below by way of example and without being limited thereto, with reference to the accompanying drawings, in which.

DESCRIPTION OF EXAMPLES OF EMBODIMENTS

Figure 1:
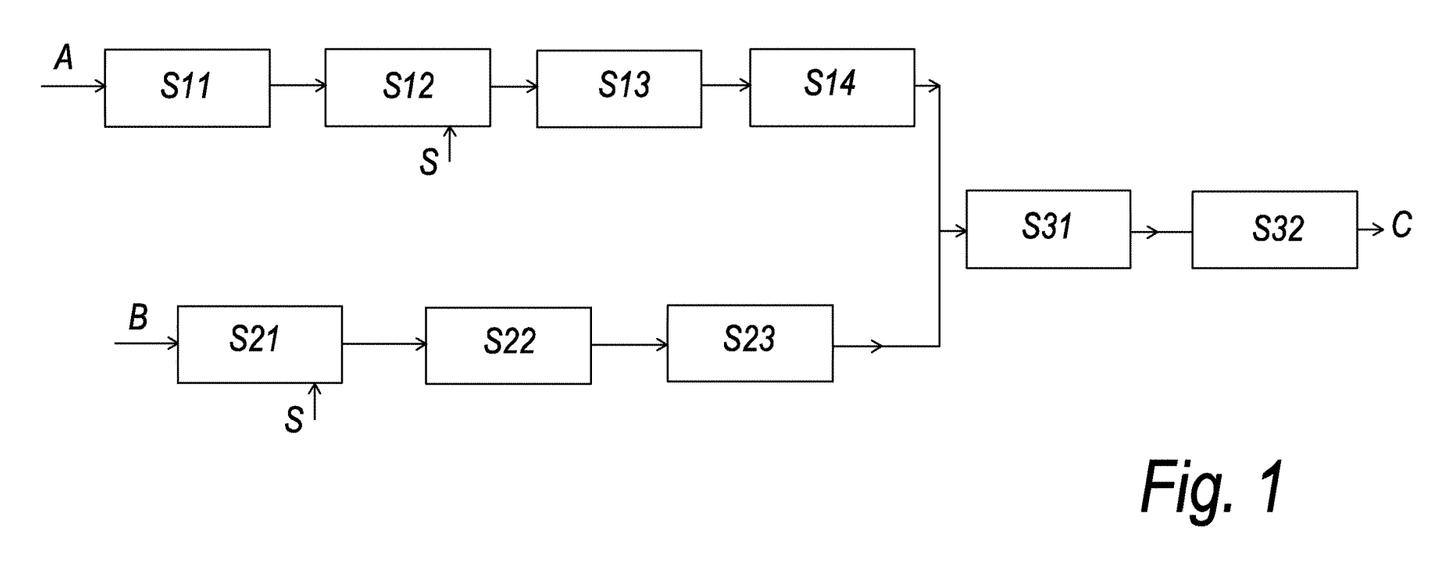
FIG. 1 diagrammatically illustrates an example or a process according to the invention for the production of MDF or HDF boards.

FIG. 1 diagrammatically illustrates an example of a process according to the invention for the production or MDF or HDF boards. This process comprises the step of recycling MDF and/or HDF board material in which recycled wood fibers are produced. The recycled wood fibers are fed into a dry production process for MDF board or HDF board as base material.

MDF and/or HDF board material (A) is introduced into the process and mechanically broken down in step S11, for example into pieces having an average size of less than 3 cubic centimeters. Preferably, dust is separated off in this step, or optionally after this step, for example by means of sieving or by means of another suitable technique.

In step S12, the broken material is wetted with steam S; optionally additives may be added in this case, but it may also be performed without additives.

In step S13, the material is then pressurized and heated; in this case, steam may be supplied, and then the steam explosion step is carried out, in which the material suddenly expands, with the pressure quickly, preferably in less than 0.5 seconds, dropping from, for example, 15 bar to 2.5 bar; or expands, preferably in 1 second or less, from 10 bar to 5 bar (with the material then, from a pressure of 5 bar being conveyed in a turbulent airflow in a blowline). This step S13 may, for example, be carried out partly or completely in a conveyor screw which conveys and compresses the material, in which case steam—optionally containing additives, but it may also not contain additives—is preferably injected into this screw. The steam explosion can then occur at the exit of the screw, where a specific opening or nozzle is provided for this purpose.

The recycled wood fibers produced in this way are then conveyed pneumatically in a turbulent flow (step S14) which may result in entangled recycled wood fibers being untangled. Optionally, the produced, recycled wood fibers may before or during this step be adhesive-coated by injecting adhesive in liquid form. To this end, the standard adhesives which are known for producing MDF or HDF boards may be used.

In parallel with the described production of recycled wood fibers, new wood fibers are produced from wood. Wood (B) is supplied. This wood (B) is supplied in the form of small pieces of wood and fed to the pre-heater and the boiler, which are denoted in FIG. 1 in combination by step S21. During pre-boiling, the small wooden pieces are heated to 80-95° C. by means of steam. In the boiler, the small wooden pieces are then brought to a temperature of, for example, 160° C. and a pressure of 8 bar by means of steam injection; the small wooden pieces remain at this temperature for three to five minutes, following which the small wooden pieces are added to the refiner. The refiner is a mechanical apparatus which consists of grinding discs with ridges into which the small wooden pieces are introduced. Due to the mechanical action of these grinding discs (step S22), the small pieces are refined to form wood fibers, so that wood fibers are obtained at the exit of the refiner which are conveyed further pneumatically in step S23. During this pneumatic conveying, the newly produced wood fibers may be coated with adhesive by injecting adhesive. It is also possible to coat the recycled wood fibers with adhesive together with the newly produced wood fibers.

In step S31, which is a pneumatic conveying step, the newly produced wood fibers are conveyed further, together with the—optionally adhesive-coated—recycled wood fibers. In this case, the recycled wood fibers and the newly produced wood fibers become mixed. Preferably, the conveying step S31 comprises a hot, turbulent air stream which dries the conveyed material and also helps to untangle the entangled wood fibers—both the recycled wood fibers and newly produced wood fibers.

Preferably—although not shown in FIG. 1—conveying in the turbulent air stream is followed by one or more separating units, for example for separating water vapor and hot gases—for example by means of a cyclone—and/or for separating off heavy constituents—preferably by means of the force of gravity.

In step S32, the actual production of the MDF or HDF board (C) takes place by means of fiber deposition and pressing the fiber mat at elevated temperature, during which the adhesive is cured.

The entire process as described proceeds in-line and continuous.

In the example described here, the composition will be uniform across the entire thickness of the produced MDF or HDF board with regard to the percentage of recycled fibers and the percentage of newly produced fibers. However, it is possible to use different supply channels, so that the board comprises layers which differ in composition regarding the combination of recycled wood fibers and newly produced wood fibers, or even comprises layers which do not comprise recycled wood fibers.

It should be noted that in the example illustrated in FIG. 1, no further mechanical refining of the recycled material occurs after the mechanical refining of the MDF or HDF board material in step S11 during the further process of producing and conveying the recycled wood fibers. However, this is possible, if desired, for example by passing the recycled material through a refiner after the steam explosion.

The example illustrated in FIG. 1 relates to a continuous process. However, it is also possible to carry out some or all of the steps in the production process discontinuously—in batches. It is, for example, possible to carry out the step of the steam explosion in a discontinuous process, in which case the material is situated in a pressurized receptacle and the pressure is quickly released as a result of which the steam explosion takes place, the material being removed from the receptacle after the steam explosion.

Figure 2:
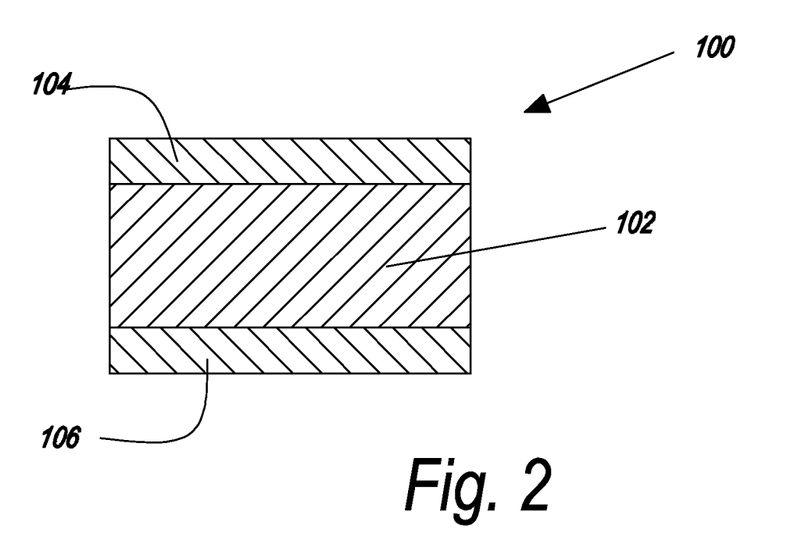
FIG. 2 illustrates an example of an MDF board produced by means of a process according to the invention.

FIG. 2 illustrates an example of an MDF board 100 produced using a process according to the invention. The resultant MDF board 100 is composed of three layers. More particularly, this MDF board is composed of a core layer 102. A surface layer 104, 106 is present on both sides of the core layer 102. The two surface layers 104, 106 do not comprises any recycled wood fibers, but only wood fibers produced from new and/or recycled wood. The core layer 102 comprises both wood fibers which have been produced from new and/or recycled wood and which have been coated with adhesive, as recycled wood fibers recovered from MDF and/or HDF board material. These recycled wood fibers may optionally have been coated with adhesive during the production process of the recycled fibers in the production process of the MDF board 100. It is possible for a decorative or functional layer to be applied to one or both surface layers, for example a printed paper layer soaked in melamine resin and pressed onto the MDF board.

The invention claimed is:

1. A process for production of particle board, MDF board or HDF board,
   wherein the process comprises a step of recycling particle board material, MDF and/or HDF board material in which recycled chips and/or recycled wood fibers are produced; and
   wherein the process comprises a step in which the particle board material, the MDF and/or HDF board material is wetted, heated and pressurized;
   wherein this material is kept under pressure and at an elevated temperate for a certain time;
   wherein the process comprises a step of steam explosion of the wetted, heated and pressurized particle board material, MDF and/or HDF board material, in which recycled chips and/or recycled wood fibers are produced during the steam explosion;
   wherein the steam explosion is a multistage steam explosion, such that expansion of the pressure occurs in a number of steam explosion steps, wherein the pressure drop during each of the steam explosion steps is less than 10 bar;
   wherein the process comprises a step of supplying the recycled chips and/or the recycled wood fibers as a first base material in a production process for particle board, MDF board or HDF board.

2. The process as in claim 1, wherein the step of wetting, heating and pressurizing comprises the step of wetting the particle board material, the MDF and/or HDF board material.

3. The process as in claim 2, wherein this wetting is performed using steam.

4. The process as in claim 1, wherein, during the wetting, heating and pressurizing step, the particle board material, the MDF and/or HDF board material is heated to a temperature of less than 240° C.

5. The process as in claim 4, wherein the particle board material, the MDF and/or HDF board material is subjected to a pressure of between 3 and 30 bar for a time of at least 15 seconds.

6. The process as in claim 1, wherein heating is achieved using steam by means of steam injection in process equipment which comprises or conveys the particle board material, MDF and/or HDF board material.

7. The process as in claim 1, wherein the steam explosion is performed after the particle board material, MDF and/or HDF board material has been conveyed in a screw.

8. The process as in claim 7, wherein the screw is configured in such a way that the particle board material, MDF and/or HDF board material in the screw is mechanically compressed.

9. The process as in claim 7, wherein steam is injected into the screw.

10. The process as in claim 1, wherein the pressure drop during the steam explosion is at least 3 bar.

11. The process as in claim 1, wherein, during the steam explosion, the pressure expands from a pressure of between 4 and 30 bar.

12. The process as in claim 1, wherein, during the steam explosion, the pressure expands in less than 3 seconds.

13. The process as in claim 1, wherein, during the steam explosion, a ratio between the pressure drop during the steam explosion and the duration of the steam explosion is greater than 5 bar/second.

14. The process as in claim 1, wherein the material undergoes a mechanical dewatering process, after the step in which the particle board material, the MDF and/or HDF board material has been wetted, heated and pressurized;
   wherein, if the process comprises steam explosion of the wetted and pressurized particle board material, MDF and/or HDF board material, the mechanical dewatering process is performed after the steam explosion step.

15. The process as in claim 1, wherein the recycled chips and/or recycled wood fibers are coated with adhesive.

16. The process as in claim 1, wherein,
   in the step of supplying the recycled chips and/or the recycled wood fibers as the first base material in the production process for particle board, MDF board or HDF board,
   wherein new chips and/or new wood fibers are used as a second base material.

17. The process as in claim 1,
   wherein this process relates to the production of MDF board or HDF board,
   wherein the recycling step relates to the recycling of particle board material or MDF and/or HDF board material in which recycled wood fibers are produced; and
   introducing the recycled wood fibers in the production process of MDF or HDF boards wherein the recycled wood fibers and also new wood fibers are used as base material in the step of producing MDF board or HDF board via a dry process.

18. The process as in claim 1, wherein the production process for producing particle board, MDF board or HDF board is a dry production process.

* * * * *